United States Patent [19]

Kamohara et al.

[11] Patent Number: 4,489,659
[45] Date of Patent: Dec. 25, 1984

[54] TRUSS-TYPE GIRDER FOR SUPPORTING A MOVABLE BODY

[75] Inventors: Hideaki Kamohara, Kudamatsu; Minoru Imamura, Yamaguchi; Hiroshi Higaki, Kudamatsu; Yuji Yoshitomi, Kudamatsu; Syuzo Uno, Kudamatsu; Kazuhiro Makino, Kudamatsu; Hiroshi Nomura; Kyozo Yoshioka, both Hikari, all of Japan

[73] Assignee: Hitachi, Ltd., Tokyo, Japan

[21] Appl. No.: 310,234

[22] Filed: Oct. 9, 1981

Related U.S. Application Data

[62] Division of Ser. No. 107,645, Dec. 27, 1979, abandoned.

[30] Foreign Application Priority Data

Jan. 10, 1979 [JP] Japan .................................. 54-1968
Jan. 10, 1979 [JP] Japan .................................. 54-1969

[51] Int. Cl.³ ............................................ E01B 25/22
[52] U.S. Cl. ........................................ 104/124; 14/3; 14/14; 104/107; 403/205; 403/237
[58] Field of Search ............. 104/106, 107, 109, 118, 104/119, 120, 124, 123, 125; 403/205, 237, 389; 14/3, 4, 13, 14

[56] References Cited

U.S. PATENT DOCUMENTS

| 382,407 | 5/1888 | Boyer | 104/124 |
| 476,982 | 6/1892 | Davis | 104/124 |
| 889,223 | 6/1908 | Graham | 403/205 X |
| 1,306,225 | 6/1919 | Humphrey | 104/124 |
| 2,855,617 | 10/1958 | Broms et al. | 14/13 |
| 3,055,484 | 9/1962 | Hubert | 14/3 X |
| 3,706,285 | 12/1972 | Gynt et al. | 104/124 |

FOREIGN PATENT DOCUMENTS

| 2338926 | 2/1975 | Fed. Rep. of Germany | 104/124 |
| 2455968 | 8/1976 | Fed. Rep. of Germany | 104/124 |
| 148650 | 12/1974 | Japan | |

OTHER PUBLICATIONS

A.P.C. Application of Thofehrn et al., Ser. No. 291,581, Published 4-27-1943.

*Primary Examiner*—Randolph Reese
*Attorney, Agent, or Firm*—Antonelli, Terry & Wands

[57] ABSTRACT

A girder for supporting a movable body has a truss structure of a cross-sectional shape forming an isosceles triangle with a horizontal base. The truss structure is formed of three main tubes of a circular cross section that are located in positions corresponding to respective corners of the triangle and extend continuously over the length of the girder. A plurality of branch tubes of circular cross section are fixed at their ends to respective pairs of the main tubes by joint pieces, such that three branch tubes lie in a plane extending through the respective joint pieces perpendicular to the longitudinal axes of the main tubes so as to form the isosceles triangle. A rail support is secured to each main tube of the base of the isosceles triangle at a position disposed upwardly and outwardly of the center thereof, and a rail, along which the movable body is traversable, is supported on each rail support.

4 Claims, 26 Drawing Figures

TRUSS-TYPE GIRDER FOR SUPPORTING A MOVABLE BODY

This is a division of application Ser. No. 107,645, filed Dec. 27, 1979, now abandoned.

BACKGROUND OF THE INVENTION

Field of the Invention

This invention relates to a truss structure composed of members of a circular cross section, and more particularly it is concerned with improvements in a joint for uniting the members to provide a truss structure.

Hitherto, in a truss structure composed of members of a circular cross section, it has been usual practice to weld the main tubes to the branch tubes directly. For example, in a two-dimensional truss structure of simple form including main tubes 1 and branch tubes 2a and 2b as shown in FIG. 1, the branch tubes 2a and 2b are united to the main tube 1 in a portion A by welding as clearly shown in FIG. 2. In the welded truss structure of this type, when a load Po is applied in the direction of an arrow in FIG. 1 to a side opposite to the side at which the structure is fixed, a load P acts on the branch tube 2a in the direction of an arrow in FIG. 2, so that local deformation develops as shown in FIG. 3 in a portion of the main tube 1 at which the branch tube 2a is connected thereto and stress of a high magnitude is produced locally.

In order to relieve such local stress, proposals have been made to use a reinforcing plate and this measure has been adopted. In this measure, a reinforcing plate 4 is welded, as shown at 6, to a portion of the main tube 1 at which the branch tubes 2a and 2b are connected thereto and then the branch tubes 2a and 2b are welded to the reinforcing plate 4 as shown at 6a and 6b respectively in FIGS. 4 and 5. By increasing the thickness of the joint of the main tube and the branch tubes, it is possible to relieve local stress. However, in a truss structure composed of members of a circular cross section, many problems are encountered besides the aforesaid problem of local stress development. They include the following:

(1) Deformation of the main tube is caused by welding. For example, as shown in FIG. 6, welding of the branch tubes 2a and 2b to the main tubes 1 causes the latter to undergo deformation as indicated by broken lines in the figure. Thus difficulties are experienced in carrying out production because high precision is required in effecting horizontal positioning and obtaining perfect straightness of the structure.

(2) Generally, a struss structure composed of members of a circular cross section has the disadvantages that operation efficiency is low, the production is time consuming and the quality of the welds is inferior to the welds produced with members of a plate form, because a plurality of branch tubes are joined to the upper and lower main tubes as shown in FIG. 6.

(3) It is necessary that in producing a truss structure of this type tolerances in dimensions should be taken into consideration so that opposite ends of the branch tubes are in intimate contact with the main tubes and no great displacements of the branch tubes occur when they are connected to the main tubes.

(4) Strength of the structure is lowered due to deformation of the members caused by welding or deterioration in the quality of the welds.

As other means for connecting the branch tubes to the main tubes, the use of a connector including pivots or pins and screws may come to mind. However, the use of such a connector makes it impossible to impart enough strength to the joints of the truss structure, and since there is a latitude of movement about the pivots and pins it is difficult to provide a truss structure of high strength. Thus the use of a mechanical connector for uniting the branch tubes to the main tubes is not suitable for use in a truss structure because such connecting means is required to have joint strength equal to or higher than the strength of the members constituting the truss structure.

SUMMARY OF THE INVENTION

Accordingly, this invention has as its objective the provision of a truss structure composed of members of a circular cross section which is high in strength and can be produced with a high degree of efficiency while deformation of the mmebers due to welding can be minimized.

The outstanding feature of the invention is that a truss structure formed of members of a circular cross section is provided with joint pieces each having at least one branch member for uniting the branch tubes to the main tubes. The truss structure can be obtained by arranging the joint pieces of a desired number in predetermined positions on at least one of the main tubes and inserting each of the branch tubes in one of branch member of the joint pieces to unite them.

DESCRIPTION OF THE PREFERRED EMBODIMENTS

Figure 1:
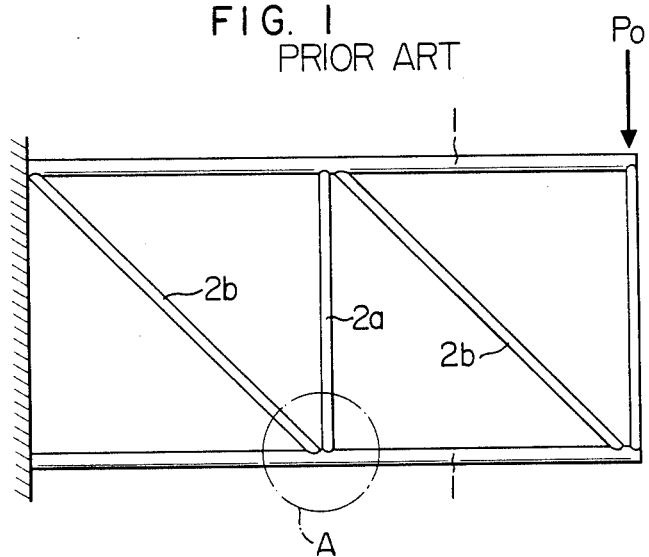
FIG. 1 is a schematic view in explanation of a truss structure of the prior art.
Figure 2:
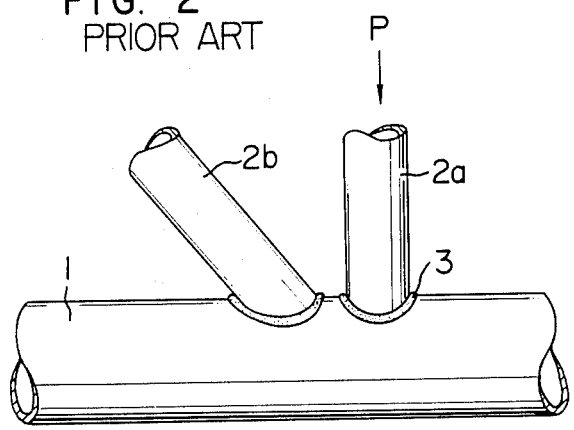
FIGS. 2 and 4 are side views of the joint of the main tube and the branch tubes.
Figure 3:
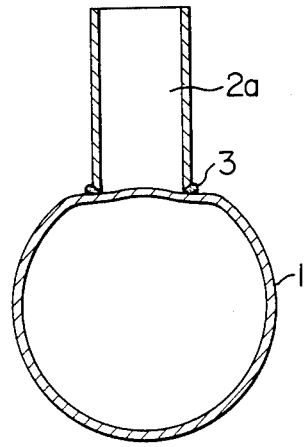
FIGS. 3 and 5 are sectional views of the joint shown in FIGS. 2 and 4 respectively.
Figure 4:
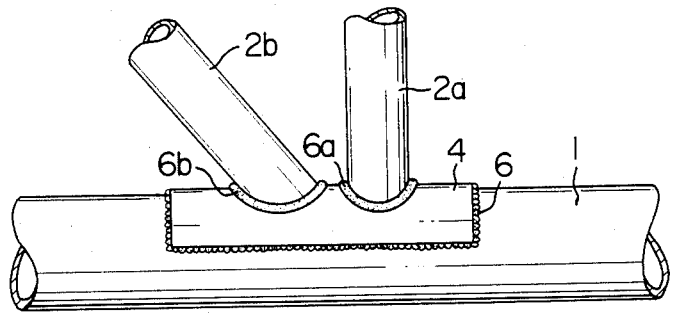
Figure 5:
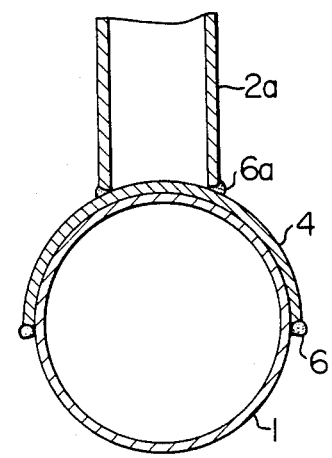
Figure 6:
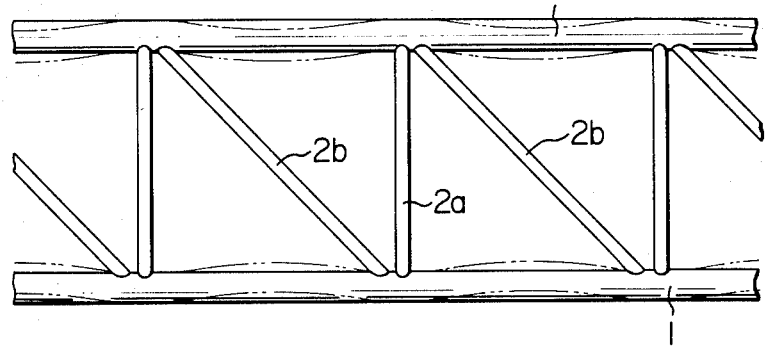
FIG. 6 is a schematic view of a truss structure of the prior art, showing deformation of the main tubes caused by welding.
Figure 7:
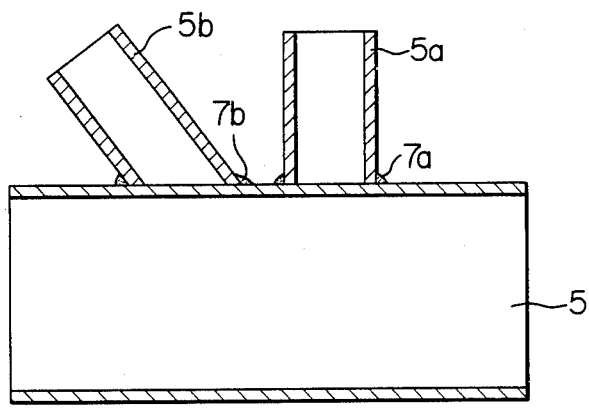
FIGS. 7, 11 and 12 are sectional views of one form of joint piece according to the invention.

FIG. 7 is a sectional view of one form of joint piece according to the invention produced by welding and having two branch members. The joint piece includes a right-angle branch member 5a and an oblique branch member 5b joined by welding to a main body 5 as shown at 7a and 7b respectively. Thus the joint piece is formed by welding the right-angle branch member 5a and oblique branch member 5b to the main body 5 of the joint piece at 7a and 7b respectively.

Figure 8:
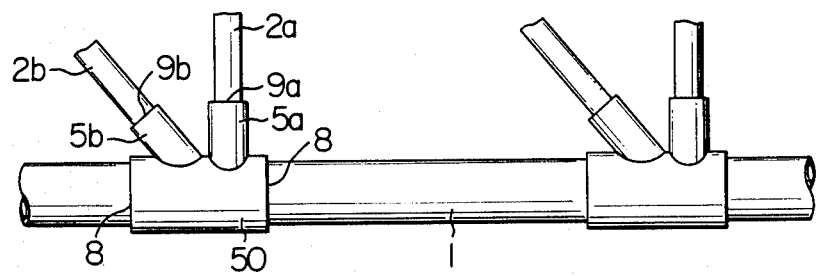
FIGS. 8-10 are schematic views in explanation of the manner in which the branch tubes are joined to the main tubes by using the joint pieces according to the invention to provide a truss structure.
Figure 9:
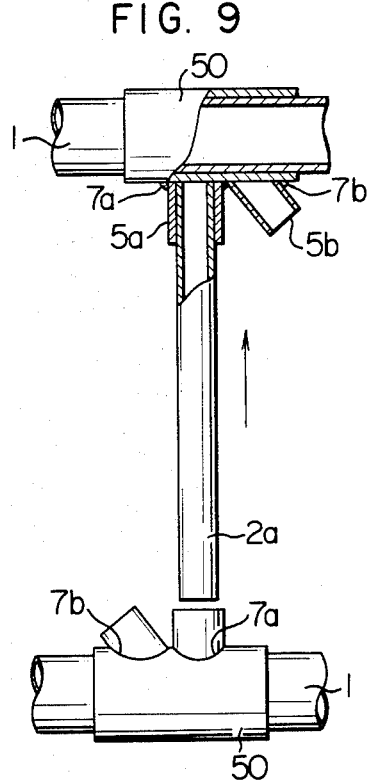
Figure 10:
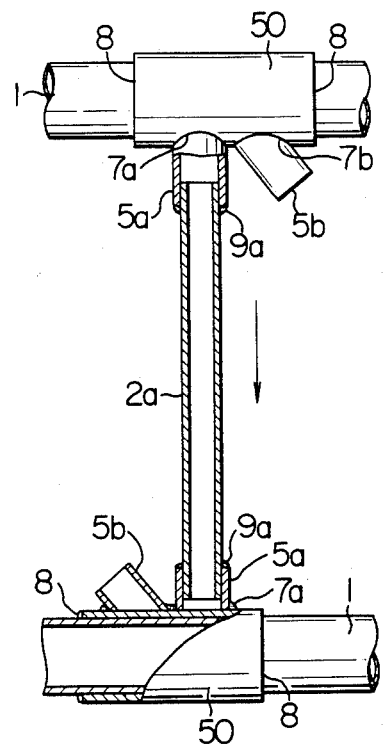

FIGS. 8-10 show the manner in which branch tubes are united to main tubes by using the joint piece shown in FIG. 7 to provide a truss structure. As shown, 1 designates main tubes, 2a and 2b designate branch tubes and 50 designates a joint piece formed by uniting the branch members 5a and 5b to the main body 5 by welding performed at 7a and 7b respectively as shown in FIG. 7. The reference numeral 8 designates a joint at which the main tube 1 is joined to the joint piece 50, and 9a and 9b are joints at which the branch tubes 2a and 2b are welded to the branch members 5a and 5b of the joint piece 50 respectively. The branch tubes 2a and 2b are joined to the main tube 1 by the following process:

(1) In FIG. 8, the main tube 1 is inserted in the joint piece 50 and the latter is arranged in a predetermined position on the former.

(2) Then the branch tubes 2a and 2b are joined to one main tube 1 as shown in FIGS. 9 and 10. In FIG. 9, the branch tube 2a is inserted in the branch member 5a of the joint piece 50 in the direction of an arrow. The branch tube 2a has its length adjusted beforehand in such a manner that when it is fitted in the branch member 5a there is a certain clearance between its lower end and the upper end of the branch member 5a of the joint piece 50 fitted over the other main tube 1.

(3) Then, as shown in FIG. 10, the branch tube 2a is moved in the direction of an arrow to insert same in the branch tube 2a of the joint piece 50 fitted over the other main tube 1.

(4) After the branch tubes 2a and 2b are inserted in the branch members 4a and 5b of the joint pieces 50 fitted over the two main tubes 1, the branch tubes 2a and 2b are joined to the main tubes 1 through the joint pieces 50 by welding performed at 9a and 9b.

The arrangement wherein the branch tubes 2a and 2b are joined to the main tubes 1 through the joint pieces 50 offers the following advantages:

(1) The portions of the main tubes forming joints with the branch tubes have their thickness increased by the joint piece so that local stress is relieved.

(2) Since the branch tubes are joined to the joint piece, deformation of the main tubes does not readily occur due to welding.

(3) Dimensional uniformity of the branch tubes can be achieved with ease.

(4) With the joint piece being produced separately, the quality of the welds provided at the joints formed between the main body and the branch members is high.

(5) Welding of the joint piece to the main tubes and branch tubes can be readily carried out so that assembling can be effected with high efficiency.

(6) The use of the joint piece for uniting the branch tubes to the main tubes increases the ridigity of the truss structure as a whole as compared with similar structures of the prior art.

(7) Allowable stress of the truss structure is increased due to the stability of the quality of the welds, the prevention of deformation caused by welding and the reinforcing effects achieved by the use of the joint piece for uniting the branch tubes to the main tubes, and strength is greatly increased.

Figure 11:
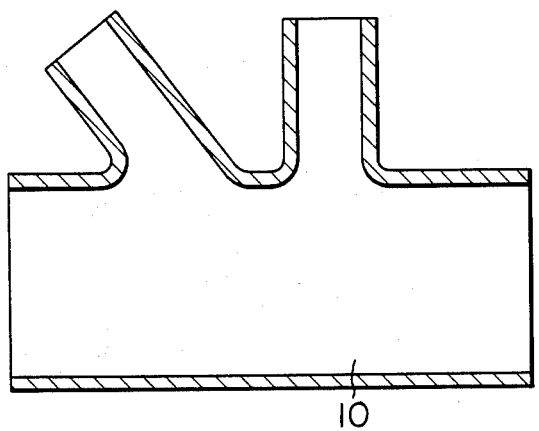
Figure 12:
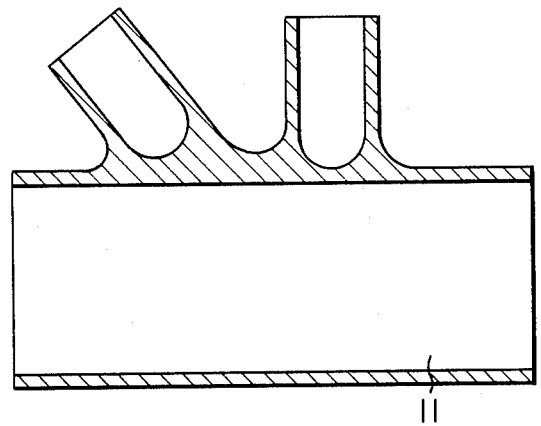

FIGS. 11 and 12 show the joint piece comprising another embodiment. FIG. 11 shows a joint piece 10 including branch members formed by plastic working and FIG. 12 shows a joint piece 11 including branch members formed of cast steel.

The use of the joint pieces 10 and 11 in place of the joint piece 50 shown in FIG. 7 for uniting the main tubes 1 and the branch tubes 2 shown in FIGS. 8-10 can achieve the following effects. Lack of the welds in the joints formed by the main body and the branch members makes the joint piece 10 having branch members of plastic working entirely free from notch effect occurring in the welds. The strength of the material is increased by plastic working, the quality is stabilized and production cost is lower than manufacturing a joint piece by welding.

The joint piece 11 having branch members of case steel allows latitude in selecting the shape and thickness of the portions of the main body where the branch members are joined, so that concentration of stress and production of local stress can be avoided.

Figure 13:
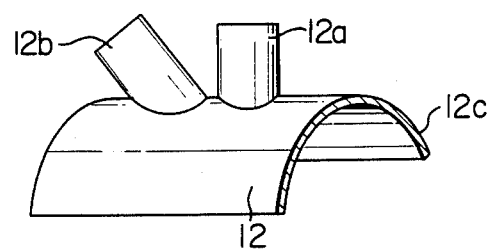
FIGS. 13-15 are schematic views in explanation of a modification of the embodiment shown in FIGS. 8-10, FIG. 13 showing another form of joint piece according to the invention, FIG. 14 showing a truss structure using the joint piece shown in FIG. 13 and FIG. 15 being a sectional view of the truss structure shown in FIG. 14.
Figure 14:
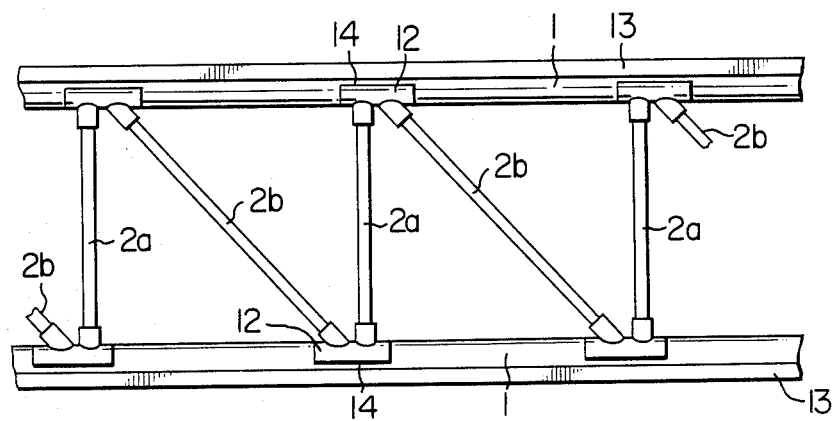
Figure 15:
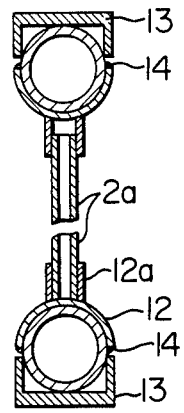

FIGS. 13-15 show still another embodiment of the invention. FIG. 13 shows a joint piece 12, and FIGS. 14 and 15 are a plan view and a sectional view respectively of a truss structure in which the joint piece shown in FIG. 13 is used. The embodiment shown in FIGS. 13-15 is distinct from the embodiment shown in FIGS. 7-10 in that the joint piece 12 of the welded structure for uniting the main tubes 1 and the branch tubes 2a and 2b includes a main body 12c in the form of a curved plate joined to the main tube 1, and branch members 12a and 12b joined to the branch tubes 2a and 2b respectively, and that a reinforcing member 13 is attached to each main tube 1. In assembling, the joint piece 12 is joined by welding at 14 to each main tube 1 reinforced by the reinforcing member 13 so that the branch tubes 2a and 2b joined to the branch members 12a and 12b respectively of the joint piece 12 can be joined to the main tube 1.

The embodiment shown in FIGS. 13-15 in which the joint piece 12 has a main body of a curved plate form and the reinforcing member 13 for the main tube 1 is used enables joints to be formed by using the joint piece 12 between branch tubes and main tubes of a shape that makes fitting of a joint piece having a tubular main body over some portions of the main tubes impossible to achieve.

In the embodiment shown and described hereinabove, joining of the main tubes to the branch tubes by means of a joint piece is achieved by welding. However, joining of the main tubes to the branch tubes for providing a truss structure through the intermediary of a joint piece may be achieved by plastic working, as described in the embodiments hereinafter to be described.

Figure 16:
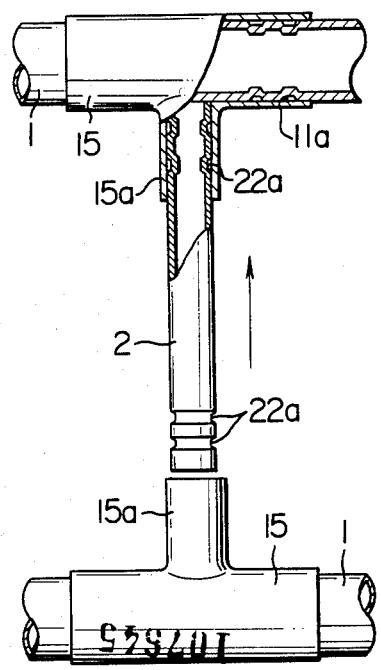
FIGS. 16 and 17 are schematic views in explanation of the manner in which the branch tube is united to the main tube by using another form of joint piece according to the invention.
Figure 17:
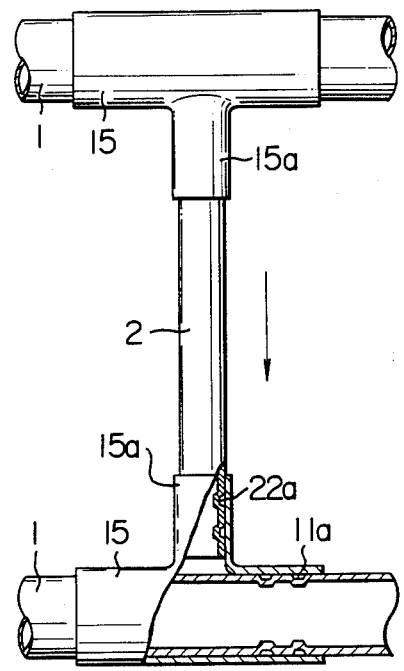
Figure 18:
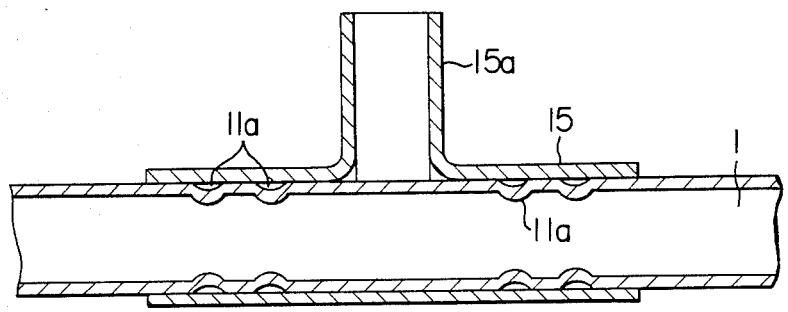
FIGS. 18 and 19 are schematic views in explanation of the manner in which the branch tube is joined to the main tube through the joint piece shown in FIGS. 16 and 17 by plastic deformation.

FIGS. 16-18 show an embodiment wherein plastic working is relied on in assembling components to provide a truss structure. In the figure, 1 is a main tube of circular cross section, 2 is a branch tube of a circular cross section and 15 is a joint piece having a branch member 15a formed integrally by plastic working. The manner in which the branch tubes 2 are united to the main tubes 1 through the agency of the joint piece 15 will be described by referring to the figures.

As shown in FIG. 18, one main tube 1 is inserted in one joint piece 15 and the joint piece 15 is arranged in a predetermined position on the main tube 1 on which circumferential grooves 11a are formed for fitting the joint piece 15 over the main tube 1. Another joint piece 15 is fitted over another main tube 1.

The upper end portion of the branch tube 2 is inserted in the branch member 15a of one joint piece 15 as shown in FIG. 16. The branch tube 2 has its length adjusted beforehand in such a manner that when the upper end thereof is inserted in the branch member 15 and moved in the direction of an arrow until it reaches the main tube 1, a certain clearance is defined between its lower end and the branch member 15a of another joint piece 15 fitted over another main tube 1. The branch tube 2 is formed at its opposite end portions with circumferential grooves 22a for fitting the branch members 15a of the joint pieces 15 over the branch tube 2. Then, as shown in FIG. 17, the lower end of the branch tube 2 is inserted in the branch member 15a of another joint piece 15 fitted over another main tube 1.

Figure 19:
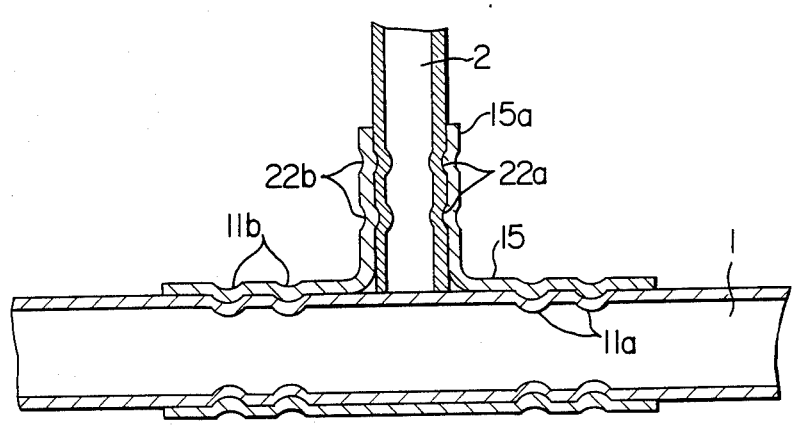

Thereafter, as shown in FIG. 19, pressure is applied from outside to each joint piece 15 so that the portions of the joint piece 15 and its branch member 15a corresponding in position to the circumferential grooves 11a and 22a on the main tube 1 and branch tube 2 respectively will undergo plastic deformation and be joined firmly thereto.

By joining the branch tube 2 to the main tubes 1 through the intermediary of the joint pieces 15 by plastic deformation, it is possible to avoid the notch effect due to welding and to avoid the production of local stress. The need to effect matching of the branch tube 2 at opposite ends thereof to the main tubes 1 is eliminated, and the branch tube 2 has only to be fitted in the branch member of the joint piece. Thus it is possible to provide large dimensional tolerances than has been possible when welding is relied on for joining the branch tubes to the main tubes, thereby enabling dimensional uniformity to be readily achieved. Since the main tubes 1 and branch tube 2 are joined to the joint pieces 15 by plastic deformation of the latter without relying on welding, it is possible to eliminate the notch effect which is produced when joints are formed by welding. Assembling can be carried out efficiently because joining can be achieved by plastic deformation of the portions of the joint piece 15 corresponding in position to the circumferential grooves formed in the main tubes 1 and branch tube 2 and by bringing these portions into contact with one another.

The use of the joint pieces 15 in joining the branch tubes 2 to the main tubes 1 enables the truss structure to have higher rigidity than truss structures of the prior art. Joining of the branch tubes to the main tubes without relying on welding to provide a truss structure makes it possible to obviate one of the problems encountered in producing a truss structure that production tolerances must be provided to cope with deformation due to welding. Thus the quality of the product can be improved and quality control can be effected with ease.

Figure 20:
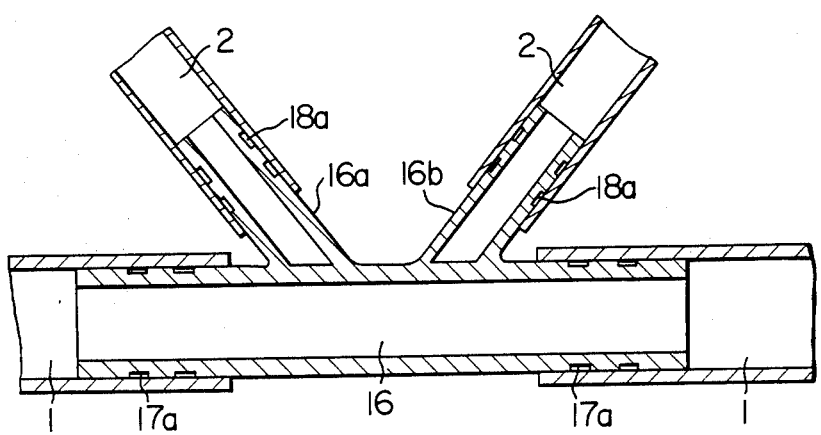
FIGS. 20 and 21 are schematic views in explanation of the manner in which the branch tubes are joined to the main tubes through still another form of joint piece according to the invention by plastic deformation.
Figure 21:
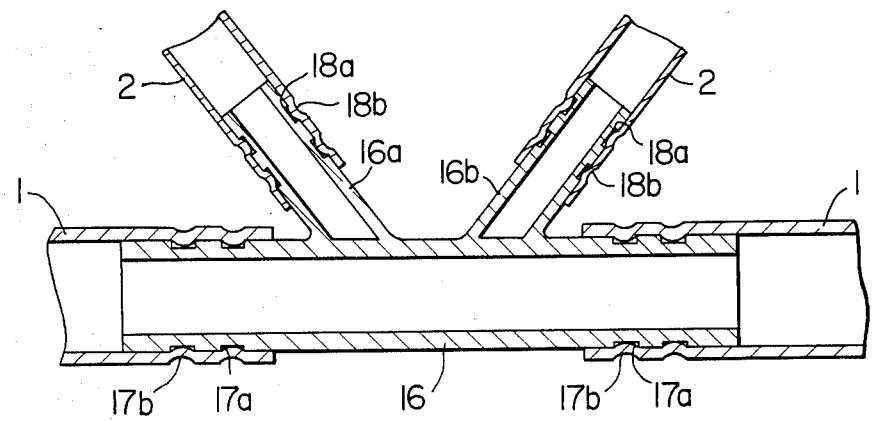

FIGS. 20 and 21 show another embodiment in which plastic deformation is utilized for providing a truss structure using joint pieces. As shown, the joint piece 16 including branch members 16a and 16b and formed with circumferential grooves 17a and 18a respectively for joining the main tubes 1 and branch tubes 2 together is inserted in the main tubes 1 while the branch members 16a and 16b are inserted in the branch tubes 2 respectively. The joint piece 16 is formed of cast steel.

The joint piece 16 is secured to the main tubes 1 and branch tubes 2 as follows. As shown in FIG. 21, pressure is applied to the main tubes 1 and branch tubes 2 from outside to cause them to undergo plastic deformation to form circumferential grooves 17b and 18b on the main tubes 1 and branch tubes 2 respectively in positions corresponding to the circumferential grooves 17a and 18a on the joint piece 16 and its branch members 16a and 16b respectively, so that the grooves 17a and 18a and 17b and 18b are interfitted to secure the main tubes 1 and branch tubes 2 tightly to the joint piece 16. The embodiment shown in FIGS. 20 and 21 offers the following advantages in addition to the advantages described hereinabove with reference to other embodiments.

The arrangement in which the main tubes 1 are inserted in the joint piece 16 makes it possible to produce a truss structure in a plurality of sections which are assembled by using the joint pieces 16 to provide the final product. The length of the main tubes 1 need not be larger than that of the joint pieces 1. Thus the use of elongated tubular members can be eliminated and management of component parts is facilitated.

In place of forming the joint piece 16 by cast steel, plastic deformation can be used for producing the joint piece 16. The joint piece 16 formed by plastic deformation can achieve the same results as the joint piece formed of cast steel.

Figure 22:
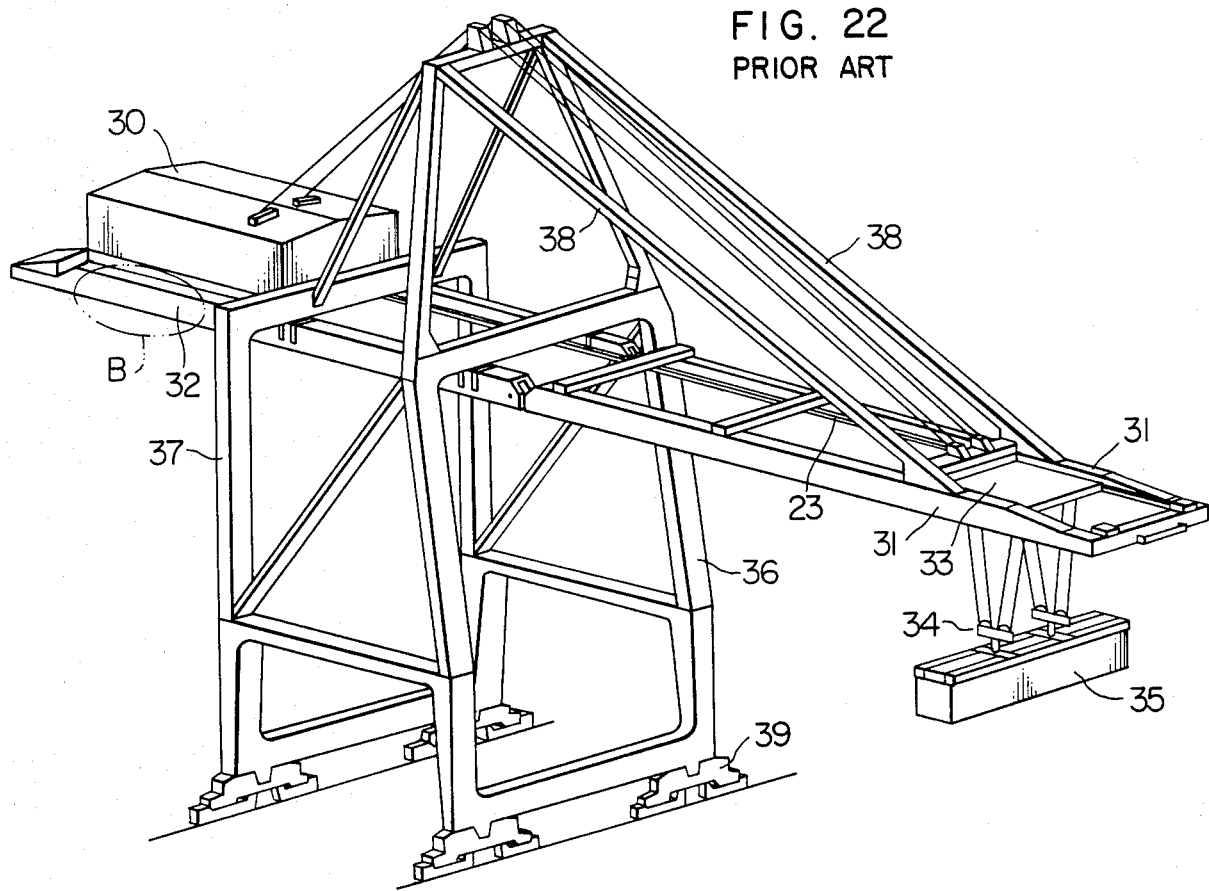
FIG. 22 is a perspective view of a container crane of the prior art.
Figure 23:
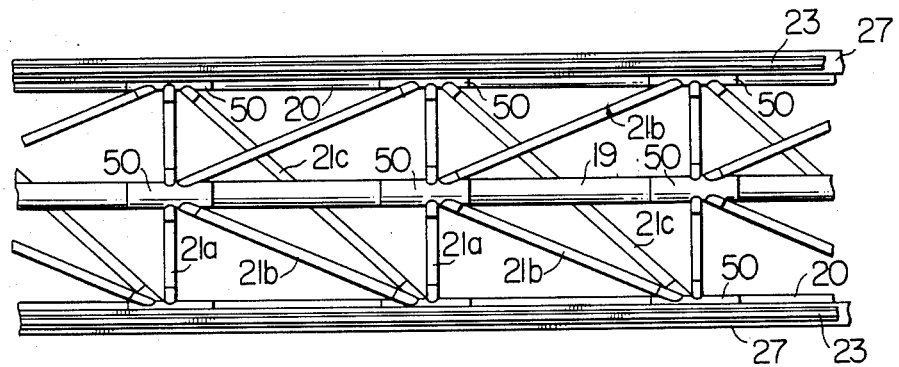
FIG. 23 is a schematic plan view of a truss girder for use with a container crane composed of steel tubes joined by using the joint piece according to the invention.
Figure 24:
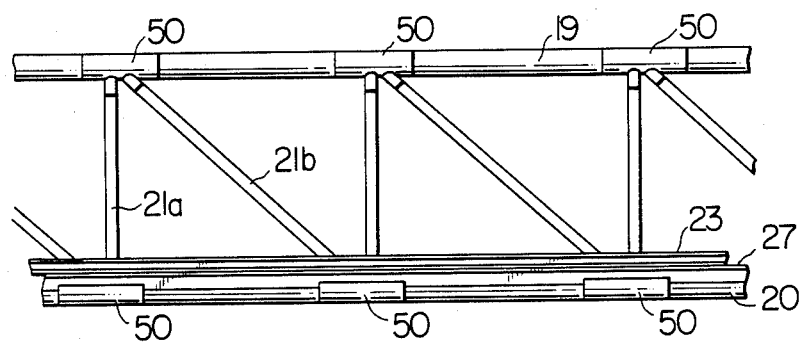
FIG. 24 is an elevational view of the truss girder shown in FIG. 23.
Figure 25:
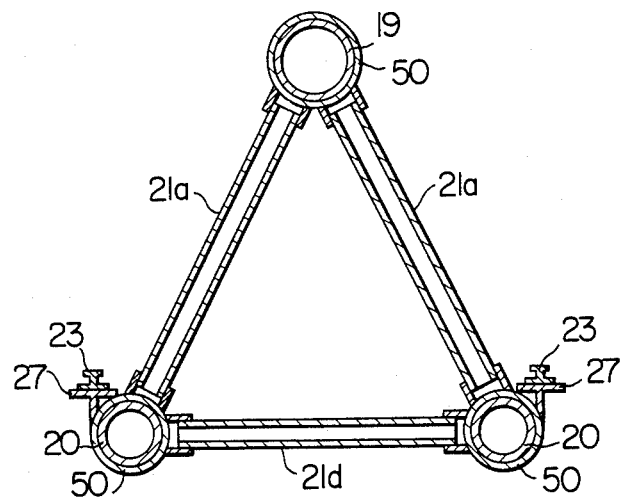
FIG. 25 is a sectional view of the truss girder shown in FIG. 24 having rails for a trolley to run therealong.
Figure 26:
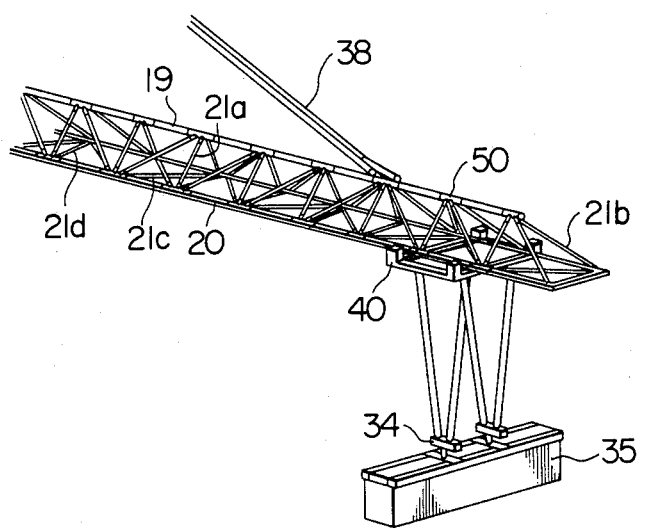
FIG. 26 is a perspective view of the truss girder of the container crane manufactured according to the invention.

Examples of application of the invention will now be described. FIG. 22 shows a container crane of the type usually found in a harbor area. As shown, the container crane includes crane girders 31 and 32 of the box shape in cross section generally referred to as girders of the box type, a trolley 33 running along rails 23 on the girders 31 and 32, a suspender 34 hung from the trolley 33, a container 35 supported by the suspender 34, a portal 36 and 37 for supporting the girders 31 and 32, and tension bars 38 for supporting the girders 31. The container crane of the aforesaid construction operates such that the suspender 34 hung from the trolley 33 hitches the container 35 and the trolley 33 runs along the rails to the desired position where it stops to allow the container 35 to be released from the suspender. The container crane itself can be moved by a travelling device 39 attached to the lower end of the portal 36 and 27 in a direction perpendicular to the length of the girders 31 and 32.

FIGS. 23-26 show an example of application of the invention in which the truss structure according to the invention is used for producing a girder that has been substituted for both girders 31 for the purpose of reducing the weight of the container crane. In the figures, 19 designates an upper main tube and 20 designates lower main tubes. The upper main tube 19 and lower main tubes 20 are interconnected by branch tubes 21a-21d joined thereto through the intermediary of joint pieces 50. The rails 23 for the trolley 40 run therealong are each supported on a T-shaped rail bed 27 welded to one of the lower main tubes 20. Like girders 31, the grider of the truss structure supports the weight of the trolley and the container 35 hung therefrom by the suspender 34 through the two rails 23. The use of the joint piece according to the invention for joining together the main tubes and the branch tubes to provide a girder of the truss structure described hereinabove offers the following advantages as described with reference to the embodiments shown and described previously.

(1) Operation efficiency is high and production steps can be greatly reduced.

(2) Perfect horizontal alignment and straightness necessary for a crane girder can be readily achieved.

(3) Local stress can be greatly relieved, so that the crane for handling bulky loads of large weight can have enough strength and reliability.

(4) An increase in the rigidity of the joints formed between the main tubes and branch tubes has the effect of reducing deformation of the girders when load is applied thereto.

Thus the use of the joint piece according to the invention for producing a box girder type crane greatly reduces the weight of the crane and its production cost, as compared with the prior art.

The truss structure according to the invention has particular utility when incorporated in structural members on which not only a static load but also a fluctuating load is applied as when a trolley having a container hung therefrom runs thereon. The joint piece 50 used in this application may be of any shape as described hereinabove in each embodiment. Both welding and plastic deformation may be relied on for joining the joint piece 50 to the main tubes 19 and 20 or the branch tubes 21a-21d.

However, when the main tubes and the branch tubes are joined to the joint piece by plastic deformation, there are possibilities that slight slip will be caused to occur in the joints by a static load of nearly the same magnitude as a yield point load or a fluctuating load of a large magnitude. Therefore, this form of joint is preferably adopted for a structural member where the static load is lower than the yield point load and the fluctuating load applied thereto is very low or none at all, such as a portion B of the girder 32 of the container crane shown in FIG. 22, where the load of a machine chamber 30 is only applied and substantially no fluctuating load acts because the trolley 33 does not run thereon during loading of the container 35 on a ship and moves with no load only at the time of inspection.

What is claimed is:

1. A girder for supporting a movable body, having a truss structure of a cross-sectional shape forming an isosceles triangle with a horizontal base, comprising:
   only three main tubes, each of said main tubes having a circular cross section and being located in a position corresponding to a respective one of three corners of the triangle and extending continuously over the length of the girder;
   a plurality of joint pieces, said joint pieces being arranged at equal intervals along each of said main tubes with each joint piece on one main tube being secured abreast a respective joint piece on the other two of said main tubes;
   a plurality of branch tubes of a circular cross section, each of said branch tubes being disposed between a respective two of said main tubes and being fixed at its ends by respective joint pieces, wherein the respective joint pieces arranged abreast one another on the three main tubes are connected by a respective three of said branch tubes that lie in a plane extending through the respective joint pieces perpendicular to the longitudinal axes of the main tubes so as to form said isosceles triangle;
   a pair of rail support means, each being secured to a respective lower one of the main tubes at a position disposed upwardly and outwardly of the center of the respective lower main tube; and
   a pair of rails along which said movable body is traversable, each rail being supported on one of said rail support means.

2. A girder according to claim 1, wherein said rail support means has a T-shaped cross section, a lower end of a vertical web thereof being welded to the respective main tube near a horizontally outermost position thereof, and an inner end of a horizontal web of the rail support means being welded to the respective main tube at a position near the uppermost point and slightly horizontally outside a vertical center plane of the respective main tube.

3. A girder according to claim 2, wherein each of said joint pieces comprises a cylindrical main body through which one of the main tubes passes and a plurality of branch members projecting from said main body for receiving a respective branch tube.

4. A girder according to claim 1, wherein branch tubes are also arranged so as to form triangles, in conjunction with said main tubes and the branch tubes in said perpendicular plane, in a facet plane of said truss.

* * * * *